(12) United States Patent
Dorman

(10) Patent No.: US 11,144,509 B2
(45) Date of Patent: *Oct. 12, 2021

(54) METHOD AND APPARATUS FOR SYNCHRONIZATION OF ITEMS IN A CLOUD-BASED ENVIRONMENT

(71) Applicant: Box, Inc., Redwood City, CA (US)

(72) Inventor: Griffin Dorman, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/255,516

(22) Filed: Jan. 23, 2019

(65) Prior Publication Data

US 2019/0155789 A1  May 23, 2019

Related U.S. Application Data

(63) Continuation of application No. 14/135,311, filed on Dec. 19, 2013, now Pat. No. 10,235,383.

(60) Provisional application No. 61/739,296, filed on Dec. 19, 2012.

(51) Int. Cl.
  *G06F 17/00* (2019.01)
  *G06F 16/176* (2019.01)
  *G06F 16/178* (2019.01)

(52) U.S. Cl.
  CPC .......... *G06F 16/176* (2019.01); *G06F 16/178* (2019.01)

(58) Field of Classification Search
  CPC ...... G06F 16/13; G06F 16/134; G06F 16/176; G06F 16/178; G06F 16/182; G06F 16/185
  See application file for complete search history.

(56) References Cited

U.S. PATENT DOCUMENTS

| | | | |
|---|---|---|---|
| 7,685,281 B1 * | 3/2010 | Saraiya | G06F 13/387 709/226 |
| 10,235,383 B2 * | 3/2019 | Dorman | G06F 16/176 |

(Continued)

OTHER PUBLICATIONS

Qinyi Wu and C. Pu, "Modeling and implementing collaborative editing systems with transactional techniques," 6th International Conference on Collaborative Computing: Networking, Applications and Worksharing (CollaborateCom 2010), Chicago, IL, USA, pp. 1-10, Oct. (Year: 2010).*

*Primary Examiner* — Greta L Robinson

(74) *Attorney, Agent, or Firm* — Sheridan Ross P.C.

(57) ABSTRACT

Techniques are disclosed for enabling synchronization of items (e.g., folders or files) in a cloud-based environment. In one embodiment, a method comprises, upon receiving a request from a collaborator to synchronize an item stored in the workspace, verifying if the collaborator has permission for downloading the item. The method further comprises, if the collaborator has permission for downloading the item, sending the item to the collaborator. The method further comprises synchronizing the item by automatically pushing an updated version of the item unilaterally from the cloud-based environment to the collaborator regardless of whether the collaborator has performed any modification to the sent item. Among other advantages, embodiments disclosed herein provide capabilities to synchronize items in cloud-based platforms, especially where items are often opened/edited among the collaborators.

38 Claims, 10 Drawing Sheets

(56) References Cited

U.S. PATENT DOCUMENTS

| | | | |
|---|---|---|---|
| 2005/0273571 A1* | 12/2005 | Lyon | G06F 12/1072 |
| | | | 711/203 |
| 2006/0200494 A1* | 9/2006 | Sparks | H04L 41/12 |
| 2012/0017037 A1* | 1/2012 | Riddle | G06F 16/25 |
| | | | 711/103 |
| 2012/0158650 A1* | 6/2012 | Andre | G06F 16/24539 |
| | | | 707/611 |

* cited by examiner

METHOD AND APPARATUS FOR SYNCHRONIZATION OF ITEMS IN A CLOUD-BASED ENVIRONMENT

CROSS-REFERENCE TO RELATED APPLICATIONS AND EFFECTIVE FILING DATE ENTITLEMENT

The present application is a continuation of U.S. patent application Ser. No. 14/135,311 filed on Dec. 19, 2013 by Griffin Dorman entitled "Method And Apparatus For Synchronization Of Items With Read-Only Permissions In A Cloud-Based Environment" and which claims benefit under 35 U.S.C. § 119(e) of U.S. Provisional Application No. 61/739,296, filed on Dec. 19, 2012 by Griffin Dorman and entitled "Synchronization Of Read-Only Files/Folders By A Synchronization Client With A Cloud-Based Platform" of which the entire disclosure is incorporated herein by reference for all purposes.

BACKGROUND

With the advancements in digital technologies, data proliferation and the ever increasing mobility of user platforms have created enormous amounts of information traffic over mobile and computer networks. This is particularly relevant with the increase of electronic and digital content being used in social settings or shared environments of digital content compared to traditional stand-alone personal computers and mobile devices. As a result, content is shared across multiple devices among multiple users.

However, conventional content sharing and content synchronization lack an intuitive and user friendly manner in which content or folders/files in a workspace shared among multiple users can be accessed and/or synchronized.

BRIEF DESCRIPTION OF THE DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
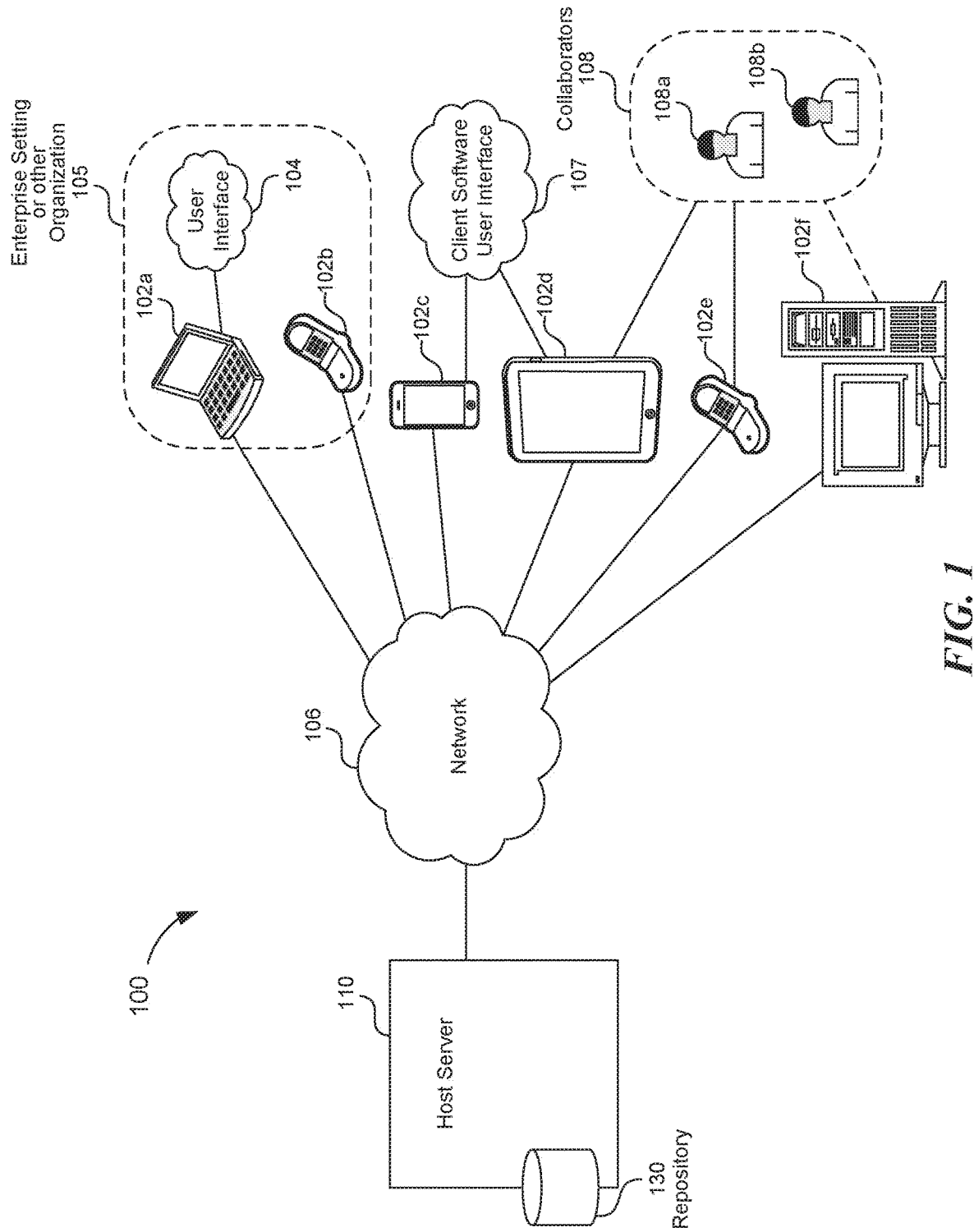
FIG. 1 depicts an example diagram of a system having a host server of a cloud service, collaboration and/or cloud storage accounts with capabilities that enable synchronization of items (e.g., files or folders) with read-only permissions in a cloud-based environment.

Techniques are disclosed for enabling synchronization of items (e.g., folders or files) with read-only permissions in a cloud-based environment. In one embodiment, a method comprises, upon receiving a request from a collaborator to synchronize an item stored in the workspace, determining whether the item is marked as read-only and verifying if the collaborator has permission for downloading the item. The method further comprises, if the item is marked as read-only and if the collaborator has permission for downloading the item, sending the item to the collaborator. The method further comprises synchronizing the item by automatically pushing an updated version of the item unilaterally from the cloud-based environment to the collaborator regardless of whether the collaborator has performed any modification to the sent item. Among other advantages, embodiments disclosed herein provide capabilities to perform synchronization of read-only files/folder by a synchronization client application with a cloud-based platform, thereby enabling more intuitive sharing and synchronization of work items (e.g., files or folders), especially in collaborative environments where items are often opened and edited among the owner user and collaborators.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates an example diagram of a system 100 having a host server 110 of a cloud service/platform, collaboration and/or cloud storage service with capabilities that enable synchronization of items (e.g., files or folders) with read-only permissions in a cloud-based environment.

The client devices 102a, 102b, 102c, 102d, 102e, and 102f (collectively referred herein as client device(s) 102) can be any system and/or device, and/or any combination of devices/systems that is able to establish a connection, including wired, wireless, cellular connections with another device, a server and/or other systems such as host server 110. Client devices 102 typically include a display and/or other output functionalities to present information and data exchanged between among the devices 102, and/or the host server 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, and host server 110 are coupled via a network 106. In some embodiments, the devices 102 and host server 110 can be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 110). The collaboration environment or platform can have one or more collective settings 105 for an enterprise or an organization that the users belong, and can provide an user interface 104 (e.g., via a webpage application (or a "web application") accessible by the web browsers of devices 102) for the users to access such platform under the settings 105. Additionally or alternatively, a client software (or "a synchronization client application") that is native to the cloud collaboration platform can be provided (e.g., through downloading from the host server 110 via the network 106) to run on the client devices 102 to provide cloud-based platform access functionalities. The users and/or collaborators can access the collaboration platform via a client software user interface 107, which can be provided by the execution of the client software on the devices 102.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user can be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace can be the same or can vary among the users. Each user can have their own set of access rights to every piece of content in the workspace, or each user can be different access rights to different pieces of content. Access rights can be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 110 communicate can be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 110 and can appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MIMS, extensible messaging and presence protocol (XMPP), real time messaging protocol (RTMP), instant messaging and presence protocol (IMPP), instant messaging, USSD, IRC, or any other wireless data networks or messaging protocols.

It is recognized in the present disclosure that, with the growing prevalence of the communication networks (e.g., the Internet) and smart portable devices (e.g., smart phones), there are many instances where a user and collaborators of the user prefer to synchronize read-only items such as folders or files that they share but are unable to do so. Specifically, typical synchronization mechanisms (e.g., as implemented by the host server 110 and/or client software on the user devices 102) are designed to skip read-only or otherwise locked items because of two reasons/assumptions. First, synchronizing read-only items complicates the overall priority and file version management among the collaborators. In addition, many files or folders are read-only or otherwise locked because they are being edited, and the user or collaborators who are performing work on them probably prefer not to synchronize intermediate results to the cloud-based platform and to other collaborators.

Nonetheless, among other advantages, present embodiments of the host server 110 adopts a comprehensive access level management (described in more details with respect to FIG. 4) with finer granularity of control over access rights of various different classes of collaborators, and accordingly, the present embodiments provides techniques and mechanisms to perform synchronization of read-only files/folder by a synchronization client with a cloud-based platform hosted by the host server 110 without the risk of violating access permissions and/or confusing various copies or versions of files from the different collaborators. The advantages provided by the techniques disclosed herein are particularly beneficial in collaborative environments where items are often opened and edited among the owner user and collaborators. In particular, embodiments implementing the disclosed techniques can allow read-only items (e.g., folders or files) to be synchronized by all classes of collaborators with download permission (e.g., co-owner, editor, viewer-uploader, and/or viewer), as compared to conventional approaches where read-only files may not be synchronized or may only be synchronized by classes of collaborators with edit permissions (e.g., co-owner, and/or editor).

More specifically, from the host server 110's perspective, the host server 110 can receive an instruction (e.g., from the collaborator 108 or the owner user using user interfaces 104 or 107) to synchronize an item stored in the workspace hosted by the host server 110. The item can be a folder or a file. For example, the owner user or an eligible collaborator of the item can select on a right-click menu (not shown for simplicity) so as to choose the item for synchronization (e.g., by adding in another collaborator as a "viewer," described in more details below). After receiving the instruction, the host server 110 can determine whether the item is marked as read-only, and can also verify if the added collaborator belongs to a class that allows downloading the item. If the collaborator belongs to the class that allows downloading the item, then the host server 110 can send the item to the collaborator; furthermore, if the item is marked as read-only, then the host server 110 can unilaterally synchronize the item by automatically pushing an updated version of the item to the collaborator 108 regardless of whether the collaborator has performed any modification to the sent item. The host server 110 should also refuse any attempt from the collaborator (assuming the collaborator has only download permissions but not edit permissions) to modify or update the read-only item stored in the workspace. By unilateral synchronization, the host server 110 and/or the synchronization client of the collaborator 108 can maintain the consistency and correctness of the read-only item (e.g., a folder or a file).

For purposes of discussion herein, "unilaterally synchronizing" or "unilateral synchronization" means that the synchronization is performed in one direction only (e.g., as compared to a bidirectional or bilateral synchronization); for example, a unilateral synchronization from the host server 110 to the collaborator 108 means that items are synchronized only in one direction from the host server 110 to the collaborator 108, but not from the collaborator 108 to the host server 110.

From the collaborator 108's perspective, after the item being identified as synchronization-eligible (e.g., through the above-mentioned instruction to synchronize), a client application running on the collaborator 108's device can receive, at the collaborator, the item from the host server 110. According to one or more embodiments, the client application can further determine whether the item includes an attribute that indicates the item being read-only. The attribute can be transmitted along with the item as an XML tag, a label, a meta data, or any other suitable method that can convey the read-only attribute of the item. Then, the client application can selectively protect the item that is received based on the determining such that the read-only attribute is preserved.

More implementation details on the host server 110, the synchronization client application, the workspace, the files and folders stored therein, and the relationship between the user and the collaborators are discussed below, and particularly with regard to FIGS. 4-5.

Figure 2:
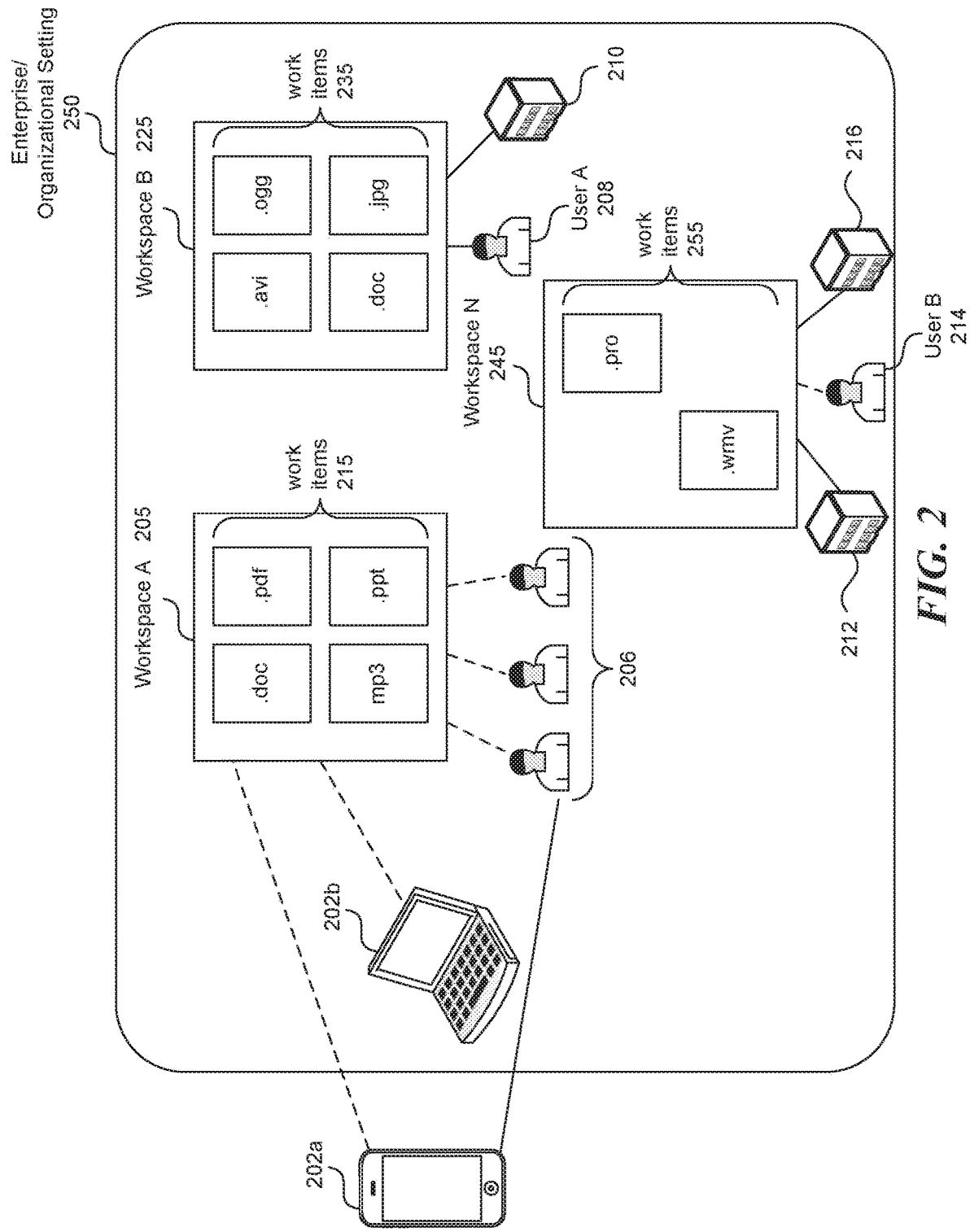
FIG. 2 depicts an example diagram of a web-based or online collaboration platform deployed in an enterprise or other organizational setting for organizing work items and workspaces.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access will depend on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limi- tation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3A:
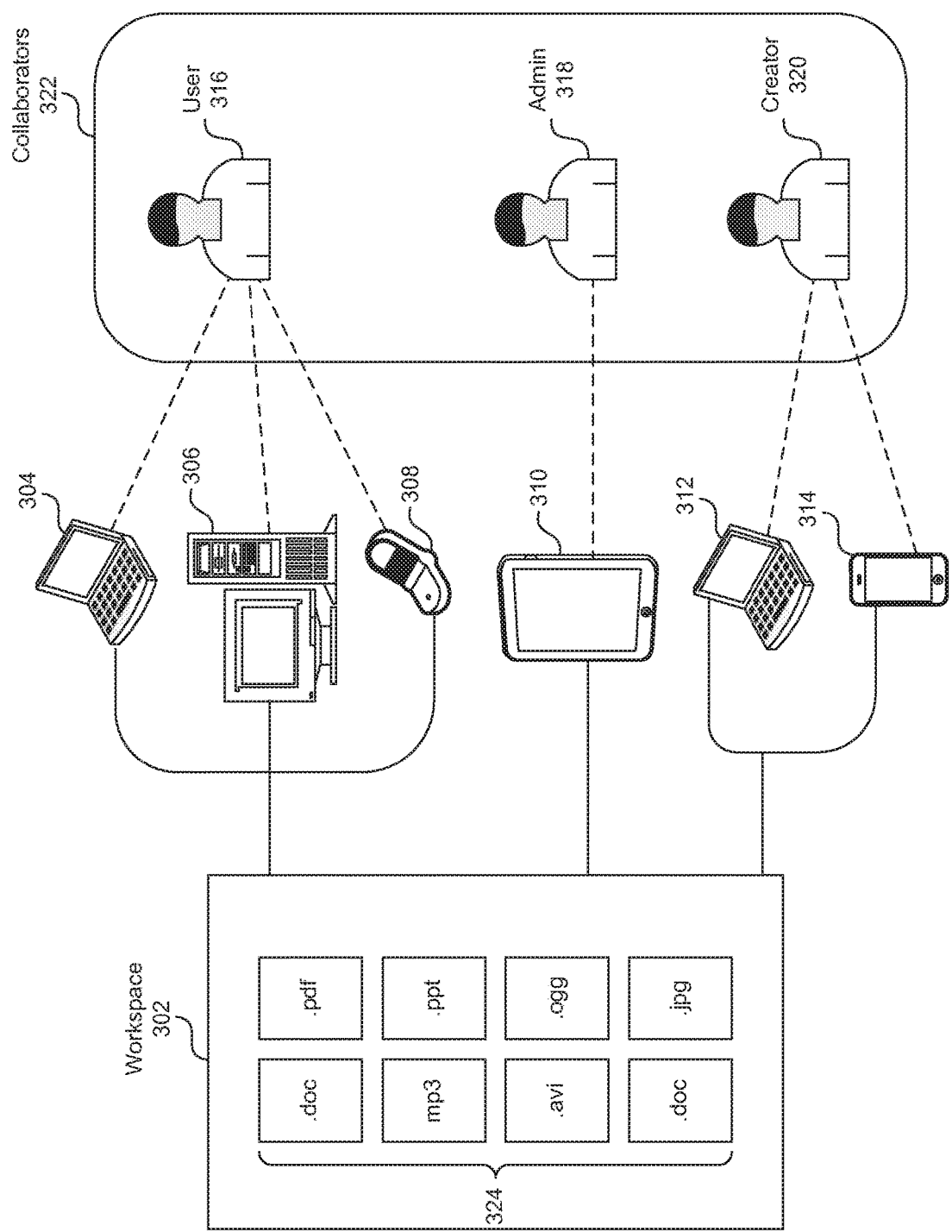
FIG. 3A depicts an example diagram of a workspace in an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
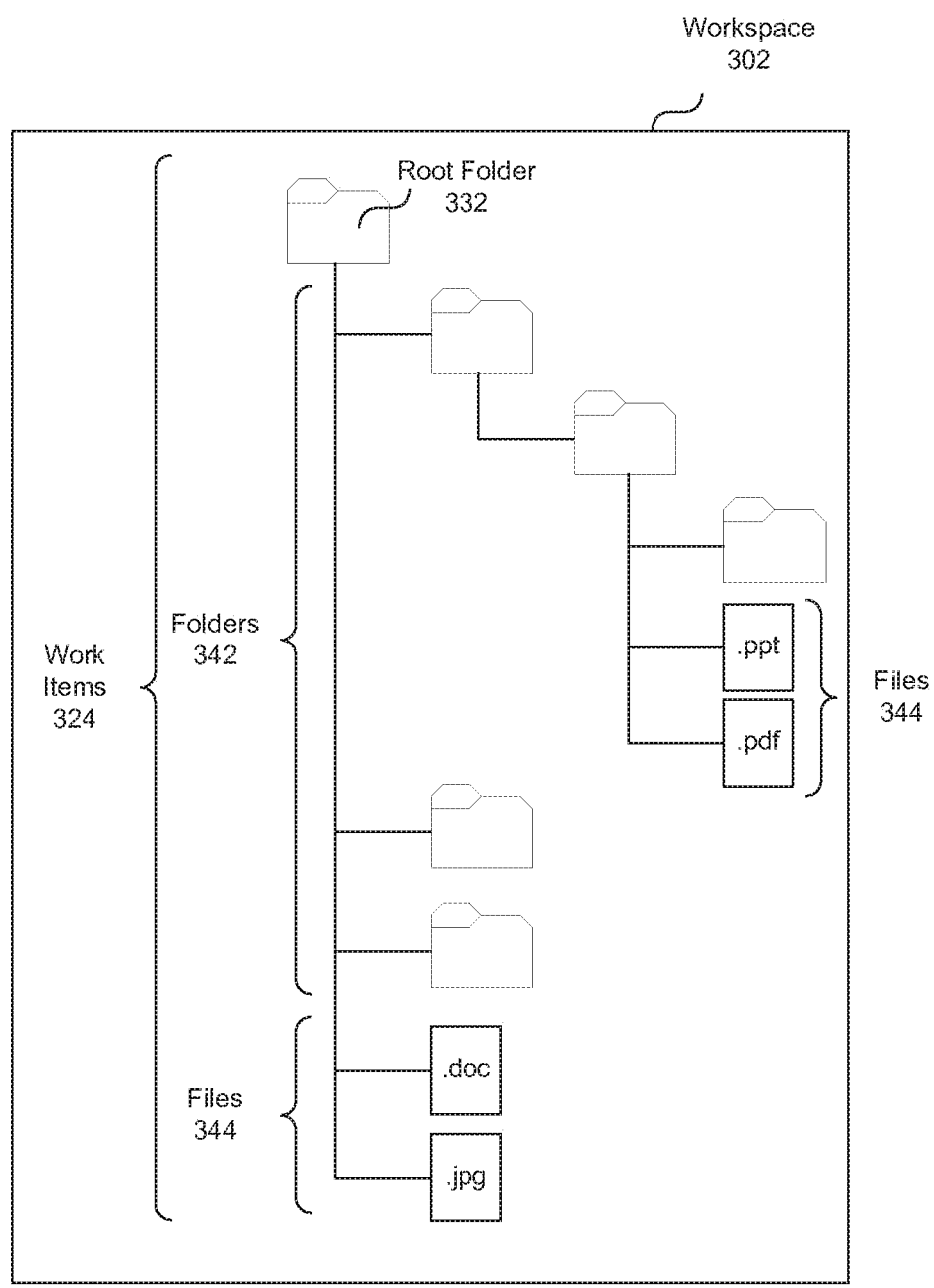
FIG. 3B depicts an abstract diagram illustrating an example data structure of the folders and files in the workspace of FIG. 3A.

FIG. 3B depicts an abstract diagram illustrating an example data structure of the folders and files in the workspace 302 of FIG. 3A. As illustrated in FIG. 3B, work items 324 of FIG. 3A can be further organized into groups using one or more folders 342 within workspace 302. The folders 342 can have more than one levels of hierarchy including, for example, parent/ascendant folder(s), child/decedent folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. It is noted that the illustration of the folders are merely exemplary; depending on the embodiments, there can be more than one level of hierarchy between the illustrated folders.

Figure 4:
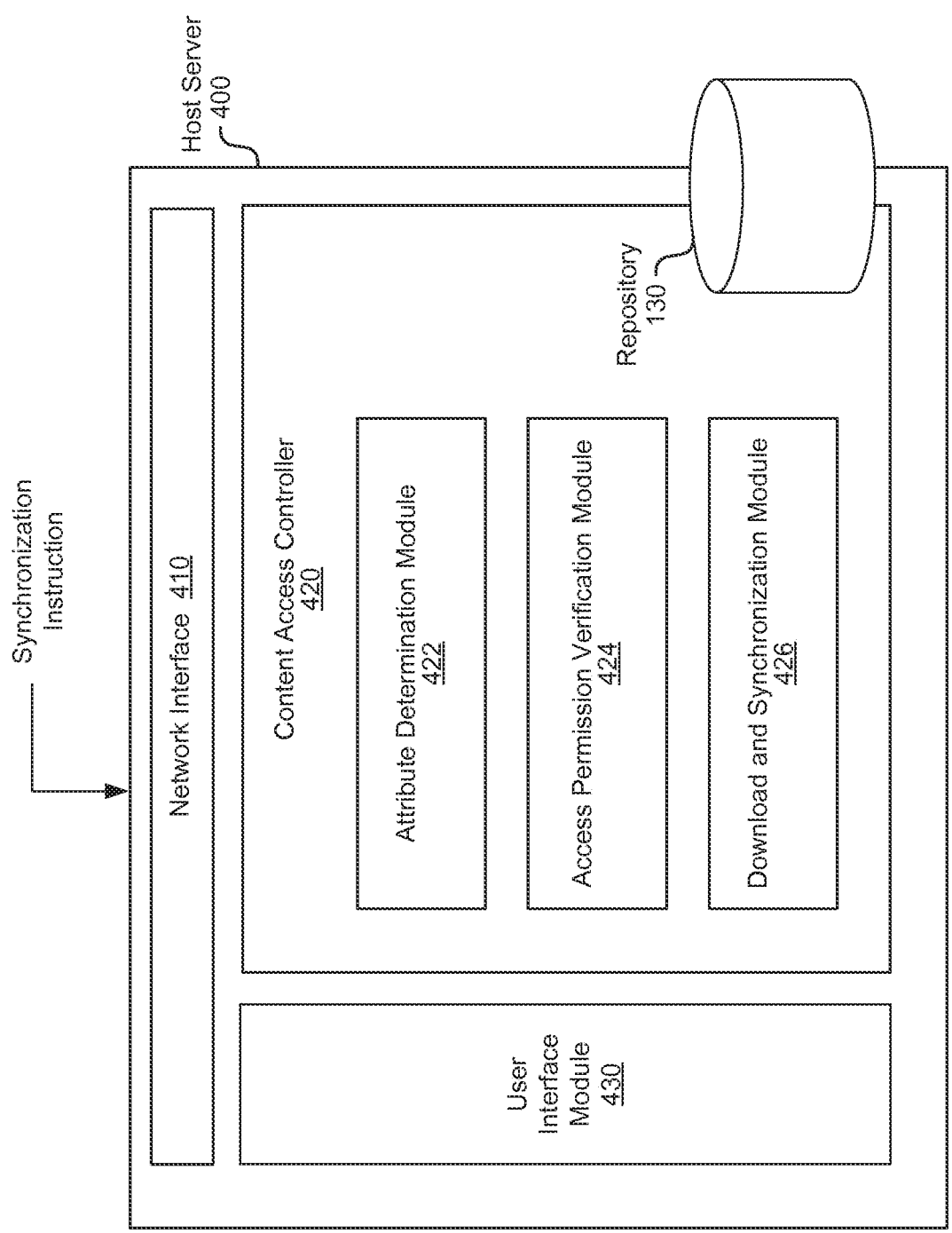
FIG. 4 depicts a block diagram illustrating an example of components in a host server with capabilities that enable synchronization of items (e.g., files or folders) with read-only permissions in a cloud-based environment.

FIG. 4 depicts a block diagram illustrating an example of components in a host server 400 (e.g., server 110, FIG. 1) with capabilities that enable synchronization of items (e.g., files or folders) with read-only permissions in a cloud-based environment, such as one hosted by the host server 110. With additional reference to FIGS. 1-3B, the synchronization techniques for read-only items which the host server 400 can employ are described.

The host server 400 of the web-based or online collaboration environment can generally be a cloud-based service. The host server 400 can include, for example, a network interface 410, a content access controller 420 having an attribute determination module 422, an access permission verification module 424, and a download and synchronization module 426. In many embodiments, the host server 400 also includes a user interface module 430 to generate web-based user interface such as interface 104 of FIG. 1. It is noted that the aforementioned modules are intended for purposes of enabling the present embodiments, rather than limiting. As such, a person of ordinary skill in the art will understand that the present disclosure covers apparent alternatives, modifications, and equivalents (e.g., combining or separating the modules) made to the techniques described herein. Additional or less components/modules/engines can be included in the host server 400 and each illustrated component.

As used herein, a "module," "a manager," an "interface," or an "engine" includes a general purpose, dedicated or shared processor and, typically, firmware or software modules that are executed by the processor. Depending upon implementation-specific or other considerations, the module, manager, interface, or engine can be centralized or its functionality distributed. The module, manager, interface, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The network interface 410 can be a networking module that enables the host server 110 to mediate data in a network with an entity that is external to the host server 110, through any known and/or convenient communications protocol supported by the host and the external entity. The network interface 410 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As previously mentioned, the present embodiments of the host server 110 can adopt a comprehensive access level management with finer granularity of control over access rights of various different classes of collaborators. An example of the access level management which the host server 110 can implement is described as "collaborator classes," which functions as access control lists of the host server 110. These classes can be used to set and apply permissions for collaborators 108 to work items (e.g., folders or files). It is noted that, although a work item (or "item") can be either a folder or a file, a person having ordinary skill in the art will understand that certain described actions are more suitable to a folder rather than a file, and vice versa. For example, in context of a collaborator attempting to "upload" or "create" a file into an item, it is logical to assume that the item is a folder instead of a file. To reduce redundant description, the following description of access permissions of different collaborator classes assumes that an item is a folder; however, as aforementioned, the item can also be a file to the extent that it is logical. The example access level management can include the following classes (or permission roles), and their respective access permissions to an item stored in the workspace is described:

"Editor:" An Editor has full read/write access to an item (e.g., a folder). Once invited to a folder, an Editor is able to view, download, upload, edit, delete, copy, move, rename, generate shared links, make comments, assign tasks, create tags, and invite/remove collaborators. An Editor is not able to delete or move root level folders.

"Viewer:" A Viewer has full read access to a folder. Once invited to a folder, a Viewer is able to preview, download, make comments, and generate shared links. A Viewer is not able to add tags, invite new collaborators, upload, edit, or delete items in the folder.

"Previewer:" A Previewer has limited read access. A Previewer is only able to preview the items in the folder using an integrated content viewer (e.g., provided as embedded in web-based user interface 104 of the workspace). A Previewer is not be able to share, upload, edit, or delete any content.

"Uploader:" An Uploader has limited write access. An Uploader is only able to upload and see the names of the items in a folder. An Uploader is not able to download or view any content.

"Previewer-Uploader:" This access level is a combination of Previewer and Uploader. A Previewer-Uploader is able to preview files using the integrated content viewer as well as upload items into the folder. A Previewer-Uploader is not be able to download, edit, or share, items in the folder.

"Viewer-Uploader:" This access level is a combination of Viewer and Uploader. A Viewer-Uploader has full read access to a folder and limited write access. A Viewer-Uploader is able to preview, download, add comments, generate shared links, and upload content to the folder. A Viewer-Uploader is not be able to add tags, invite new collaborators, edit, or delete items in the folder.

"Co-Owner:" A Co-Owner has all of the functional read/write access that an Editor does. This permission level has the added ability of being able to manage users in the folder. A Co-Owner can add new collaborators, change access levels of existing collaborators, and remove collaborators. However, a Co-Owner is not be able to manipulate the Owner of the folder or transfer ownership to another user.

With the above collaborator classes in mind, the present embodiments of host server 400 can perform synchronization of read-only files/folder in workspace hosted by the host server 400 with a synchronization client.

More specifically, from the host server 400's perspective, the host server 400 can receive an instruction to synchronize an item stored in the workspace hosted by the host server 400. In some embodiments, the instruction can be sent from a web application user interface 104 and received by the user interface module 430. In some additional or alternative embodiments, the instruction can be sent from a client software user interface 107 and received by the network interface 410. The item can be a folder or a file. For example, the owner user or an eligible collaborator (e.g., who has download permissions) of the item can select on a right-click menu (not shown for simplicity) so as to choose the item for synchronization. The synchronization selection can be done either for the action performer himself, or for others by adding in another collaborator as a "viewer," for example).

Figure 6:
FIG. 6 depicts a table illustrating example classes available for collaborators and their respective access rights.

After receiving the instruction, the host server 400 can employ the attribute determination module 422 to determine (e.g., via querying the repository 130) whether the item is marked as read-only. Also, the host server 400 can employ the access permission verification module 424 to verify (e.g., via querying the repository 130) if the added collaborator has permission for downloading (e.g., by verifying that the collaborator belongs to a class which allows downloading) the item. If the collaborator belongs to the class that allows downloading the item, then the host server 400 can employ the download and synchronization module 426 to send the item to the collaborator. In some embodiments, the item is sent with an attribute that indicates the item being read-only. A table 600 illustrating example classes available for collaborators and their respective access rights is depicted in FIG. 6. In the example shown in table 600, collaborator classes that allow downloading the item include a co-owner, an editor, a viewer-uploader, and a viewer of the item.

Further, if the item is marked as read-only, then the host server 400 can employ the download and synchronization module 426 to unilaterally synchronize the item by automatically pushing an updated version of the item to the collaborator 108 regardless of whether the collaborator has performed any modification to the sent item. In some embodiments, the automatic pushing is performed as soon as the updated version of the item becomes available. The content access controller 420 should also refuse any attempt from the collaborator 108 (assuming the collaborator has only download permissions but not edit permissions) to modify or update the read-only item stored in the workspace.

In addition, some embodiments of the host server 400 provide that, if the collaborator 108 is then removed from the class that allows downloading the item, the content access controller 420 can send an instruction (e.g., to the synchronization client application of the collaborator 108) to cause deletion of the item to the collaborator.

Figure 5:
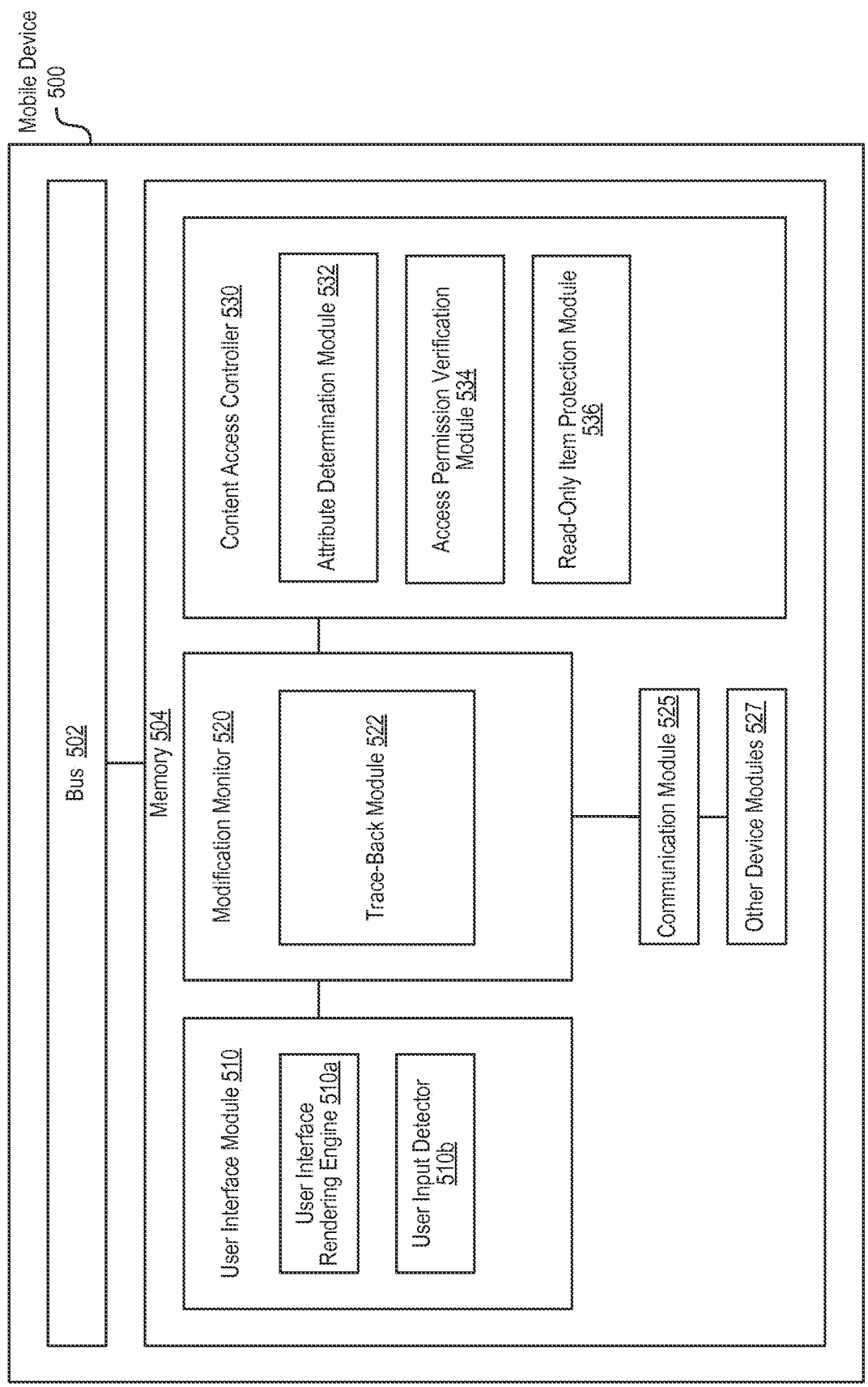
FIG. 5 depicts a block diagram illustrating an example of components in a mobile device with a synchronization client application that enables synchronization of items (e.g., files or folders) with read-only permissions in a cloud-based environment.

FIG. 5 depicts a block diagram illustrating an example of components in a mobile device (e.g., devices 102, FIG. 1; devices 202a and 202b, FIG. 2; devices 304-314, FIG. 3) with a synchronization client application utilizing one or more techniques disclosed herein that enables synchronization of items (e.g., files or folders) with read-only permissions in a cloud-based environment.

The mobile device 500 can include, for example, a bus 502, and a memory 504 among other components. The memory 504 may include a user interface module 510, a modification monitor 520 and a content access controller 530. The memory 504 can also include a communication module 525 that facilitates communication between the mobile device 500 and the host server 110, 400 using any of the communication protocols supported by the mobile device 500 and the host server 110, 400. The memory 504 may also include other device modules 527 such as a GPS module for determining and providing location information, text input module for accepting and processing inputs provided using different input mechanisms of the mobile device, and the like for handling various functions of the mobile device 500. Additional or less components/modules/engines can be included in the mobile device 500 and each illustrated component.

The bus 502 is a subsystem for transferring data between the components of the mobile device 500. For example, the bus 502 facilitates the transfer of data between the memory 504 and other components of the mobile device such as the processor and/or the input/output components that utilize the data.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, the user interface module 510 can include a user interface rendering engine 510a and a user input detector 510b. The user interface rendering engine 510a includes program codes that accept data in Extensible Markup Language (XML), JavaScript Object Notation (JSON) or other forms and formatting or style information (e.g., Cascading Style Sheets (CS S)) to display the formatted content on the screen of the mobile device. An example of the rendering engine 510a is the webkit layout engine used in the Android platform. The rendering engine 510a may utilize C/C++ libraries such as SQL lite and graphics libraries such as OpenGL ES to render user interface graphics. The user input detector 510*b* can be coupled to one or more suitable pieces of hardware, for example, an actuatable button, a keyboard, a touchscreen, a gesture capturing device, a camera, a mouse, a microphone, and so forth, to receive user inputs for selecting and performing actions on the contents, whether stored in the cloud-based workspace 302 or locally on the device 500.

As previously described, overall, the mobile device 500 can provide, working in conjunction with the host server 110, 400, synchronization of a read-only item stored in a workspace 302 hosted by a cloud-based platform.

More specifically, from the collaborator 108's perspective, after the item being identified as synchronization-eligible (e.g., through the above-mentioned instruction to synchronize), a client application running on the mobile device 500 can receive (e.g., via the communication module 525) the item from the host server 400. According to one or more embodiments, the mobile device 500 can further employ the attribute determination module 532 of the content access controller 530 to determine whether the item includes an attribute that indicates the item being read-only. The attribute can be transmitted along with the item as an XML tag, a label, a meta data, or any other suitable method that can convey the read-only attribute of the item. Then, the mobile device 500 selectively employ the read-only item protection module 536 of the content access controller 530 to protect the item that is received based on the determining such that the read-only attribute is preserved. In some implementation, when the synchronization instruction can be sent from the mobile device 500 by an eligible user, and the mobile device 500 can transmit the instruction to the host server 400 so as to synchronize the item stored in the workspace.

In some embodiments, the content access controller 530 can lock the item (e.g., by operation system function calls) so as to prevent any modification to be performed onto the item by the collaborator if the item is a read-only item. Additionally or alternatively, some embodiments of the modification monitor 520 can utilize the modification monitor 520 to implement an operating system (OS) hook so as to intercept a function call, a message, an event, or the like, that relates to modifying content of the item. In one or more embodiments, the content access controller 530 can also mark the received item locally as read-only if the item is a read-only item.

Furthermore, in some implementations, the content access controller 530 can selective protect the read-only item from being modified in response to what type of action (e.g., as received from the user interface module 510) the collaborator attempts to perform on the item. More details of the selective protection are now described.

In some embodiments, if the modification monitor 520 detects that the collaborator attempts to modify the item, then the read-only item protection module 536 can rename the modified version of the item as a copy, and re-download the item from the host server 400. Optionally, the content access controller 530 can mark the copy as a problem item, which can generate a graphical alert on an user interface (e.g., interface 107, FIG. 1) of the client application to call for the action performer's attention of his potential access permission violation in accordance with some embodiments.

Still in some embodiments, if the modification monitor 520 detects that the collaborator attempts to rename the item, then the read-only item protection module 536 can employ the trace-back module 522 to rename the item back to its original name.

In some additional embodiments, if the modification monitor 520 detects that the collaborator attempts to move the item, then the read-only item protection module 536 can employ the trace-back module 522 to move the item back to its original location.

In some embodiments, if the modification monitor 520 detects that the collaborator attempts to delete the item, then the read-only item protection module 536 can employ the trace-back module 522 to move or restore the item back from a temporary delete storage (e.g., a "recycle bin" or a "trash can") to its original location. Additionally or alternatively, the content access controller 530 can re-download the item from the workspace.

In some embodiments where the item is a folder in the workspace, if the modification monitor 520 detects that the collaborator attempts to create a file in the folder, the content access controller 530 first employ the access permission verification module 534 to verify whether the collaborator has permission to upload. For example, if the collaborator is a Viewer-Uploader, he or she has the permission to upload; on the contrary, if the collaboration is merely a Viewer, he or she does not have the permission to upload a file into a folder. Then, if it is determined that the collaborator does not have the permission to upload, the content access controller 530 can mark the file as a problem item, which can optionally generate a graphical alert on an user interface (e.g., interface 107, FIG. 1) of the client application to call for the action performer's attention of his potential access permission violation in accordance with some embodiments.

In some embodiments, upon receiving an instruction to delete the item, the content access controller 530 can remove (e.g., delete) the item from all local storages on the mobile device 500.

Figure 7:
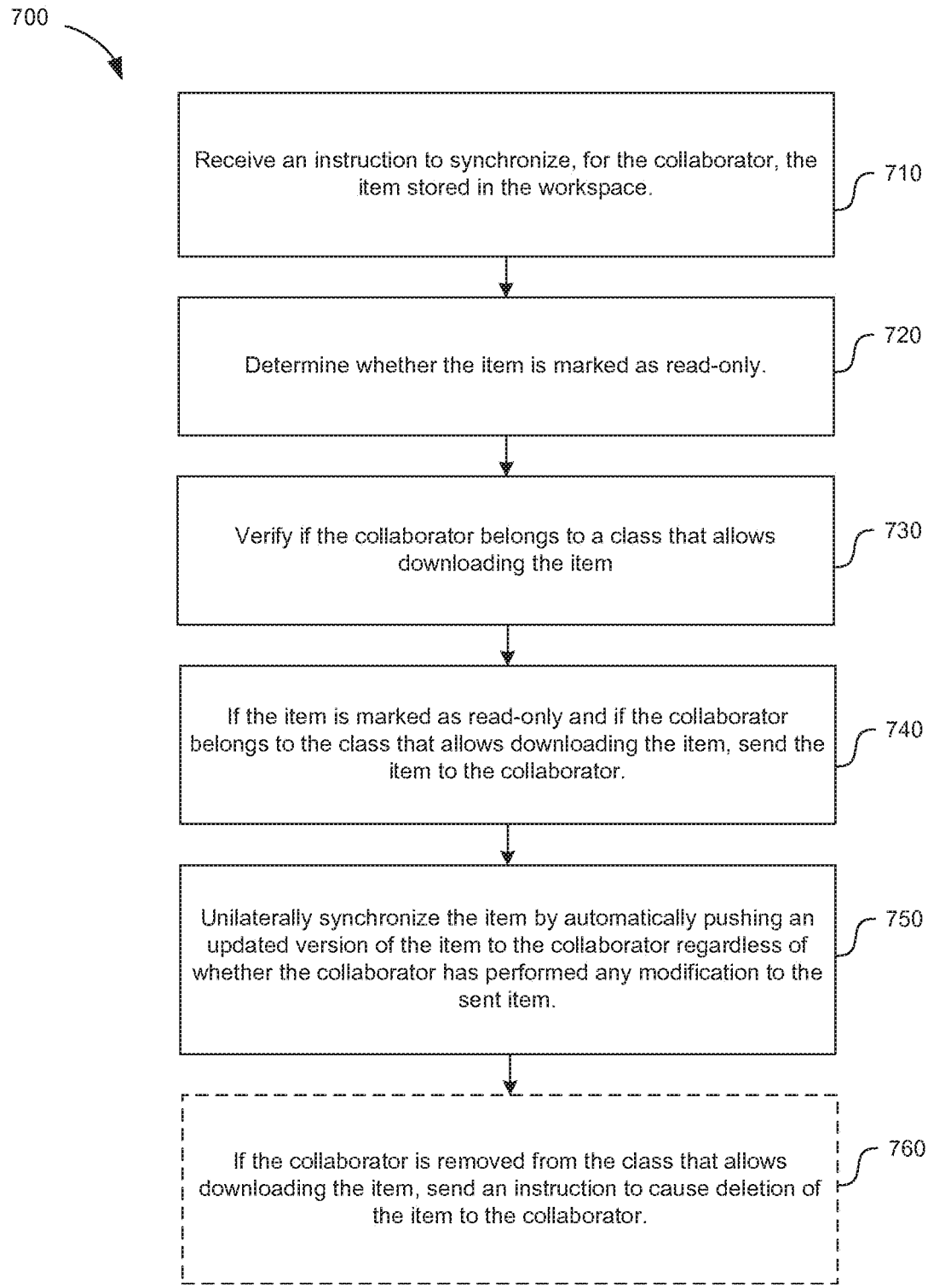
FIG. 7 depicts a flowchart illustrating an example process for a host server in synchronizing items (e.g., files or folders) with read-only permissions in a cloud-based environment.

FIG. 7 depicts a flowchart illustrating an example process 700 for a host server (e.g., host server 110, FIG. 1; host server 400, FIG. 4) in synchronizing items (e.g., files or folders) with read-only permissions in a workspace (e.g., workspace 302, FIGS. 3A-3B) of a cloud-based environment with a client application (e.g., on client devices 102, FIG. 1; device 500, FIG. 5). The process 700 is performed, for example, by a processor that is included on the server 110,400. Workspace 302 (e.g., workspaces A 205, B 225, or N 245, FIG. 2) is shared among a user of the client devices 102 and one or more collaborators (e.g., collaborators 108, FIG. 1) of the user. The host server 110 is a server that hosts the cloud-based environment.

In accordance with some embodiments, the host server 400 can receive (710) an instruction to synchronize an item stored in the workspace hosted by the host server 400. In some embodiments, the instruction can be sent from a web application user interface 104 and received by the user interface module 430. In some additional or alternative embodiments, the instruction can be sent from a client software user interface 107 and received by the network interface 410. The item can be a folder or a file. For example, the owner user or an eligible collaborator (e.g., who has download permissions) of the item can select on a right-click menu (not shown for simplicity) so as to choose the item for synchronization. The synchronization selection can be done either for the action performer himself, or for others by adding in another collaborator as a "viewer," for example).

After receiving the instruction, the host server 400 can employ the attribute determination module 422 to determine (720) (e.g., via querying the repository 130) whether the item is marked as read-only. Also, the host server 400 can employ the access permission verification module 424 to verify (730) (e.g., via querying the repository 130) if the added collaborator belongs to a class that allows downloading the item. If the collaborator belongs to the class that allows downloading the item, then the host server 400 can employ the download and synchronization module 426 to send (740) the item to the collaborator. In some embodiments, the item is sent with an attribute that indicates the item being read-only. A table 600 illustrating example classes available for collaborators and their respective access rights is depicted in FIG. 6. In the example shown in table 600, collaborator classes that allow downloading the item include a co-owner, an editor, a viewer-uploader, and a viewer of the item.

Further, if the item is marked as read-only, then the host server 400 can employ the download and synchronization module 426 to unilaterally synchronize (750) the item by automatically pushing an updated version of the item to the collaborator 108 regardless of whether the collaborator has performed any modification to the sent item. In some embodiments, the automatic pushing is performed as soon as the updated version of the item becomes available. The content access controller 420 should also refuse any attempt from the collaborator 108 (assuming the collaborator has only download permissions but not edit permissions) to modify or update the read-only item stored in the workspace.

In addition, some embodiments of the host server 400 provide that, if the collaborator 108 is then removed from the class that allows downloading the item, the content access controller 420 can send (760) an instruction (e.g., to the synchronization client application of the collaborator 108) to cause deletion of the item to the collaborator.

Figure 8:
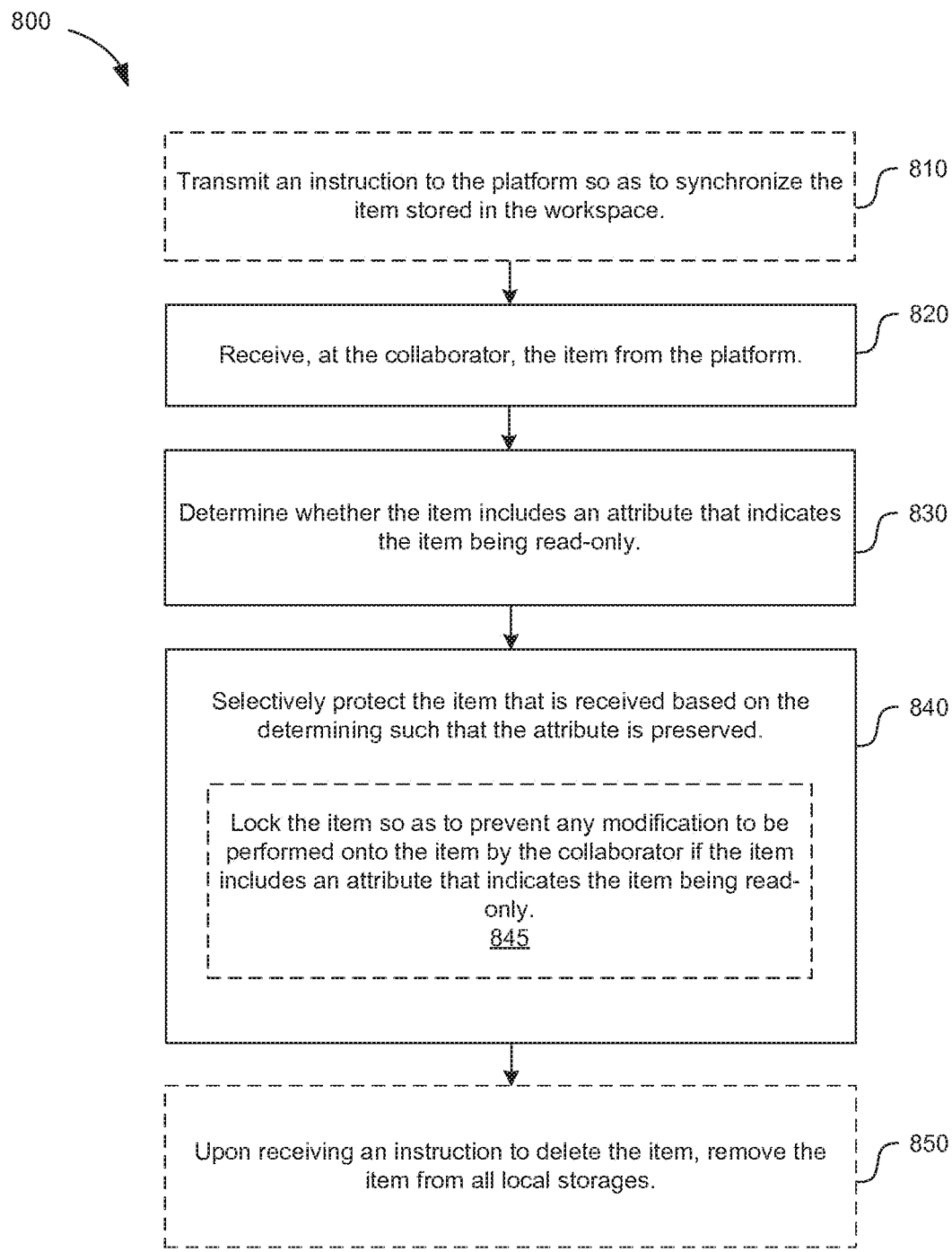
FIG. 8 depicts a flowchart illustrating an example process for a client application in synchronizing items (e.g., files or folders) with read-only permissions in a cloud-based environment.

FIG. 8 depicts a flowchart illustrating an example process 800 for a client application (e.g., on client devices 102, FIG. 1; device 500, FIG. 5) in synchronizing items (e.g., files or folders) with read-only permissions in a workspace (e.g., workspace 302, FIGS. 3A-3B) of a cloud-based environment hosted by a host server (e.g., host server 110, FIG. 1; host server 400, FIG. 4). The process 800 is performed, for example, by a processor that is included on the client device 102, 500. Workspace 302 (e.g., workspaces A 205, B 225, or N 245, FIG. 2) is shared among a user of the client devices 102 and one or more collaborators (e.g., collaborators 108, FIG. 1) of the user. The host server 110, 400 is a server that hosts the cloud-based environment.

In some implementation, when the synchronization instruction can be sent from the mobile device 500 by an eligible user, and the mobile device 500 can transmit (810) the instruction to the host server 400 so as to synchronize the item stored in the workspace. In accordance with some embodiments, the mobile device 500 can receive (820) (e.g., via the communication module 525) the item from the host server 400. According to one or more embodiments, the mobile device 500 can further employ the attribute determination module 532 of the content access controller 530 to determine (830) whether the item includes an attribute that indicates the item being read-only. The attribute can be transmitted along with the item as an XML tag, a label, a meta data, or any other suitable method that can convey the read-only attribute of the item. Then, the mobile device 500 selectively employ the read-only item protection module 536 of the content access controller 530 to protect (840) the item that is received based on the determining such that the read-only attribute is preserved.

In some embodiments, the content access controller 530 can lock (845) the item (e.g., by operation system function calls) so as to prevent any modification to be performed onto the item by the collaborator if the item is a read-only item. Additionally or alternatively, some embodiments of the modification monitor 520 can utilize the modification monitor 520 to implement an operating system (OS) hook so as to intercept a function call, a message, an event, or the like, that relates to modifying content of the item. In one or more embodiments, the content access controller 530 can also mark the received item locally as read-only if the item is a read-only item.

Furthermore, in some implementations, the content access controller 530 can selective protect the read-only item from being modified in response to what type of action (e.g., as received from the user interface module 510) the collaborator attempts to perform on the item. More details of the selective protection are described above with respect to FIG. 5.

In some embodiments, upon receiving an instruction to delete the item, the content access controller 530 can remove (850) (e.g., delete) the item from all local storages on the mobile device 500.

Overall, the techniques disclosed herein provide capabilities to perform synchronization of read-only files/folder by a synchronization client application with a cloud-based platform, thereby enabling more intuitive sharing and synchronization of work items (e.g., files or folders), especially in collaborative environments where items are often opened and edited among the owner user and collaborators.

Figure 9:
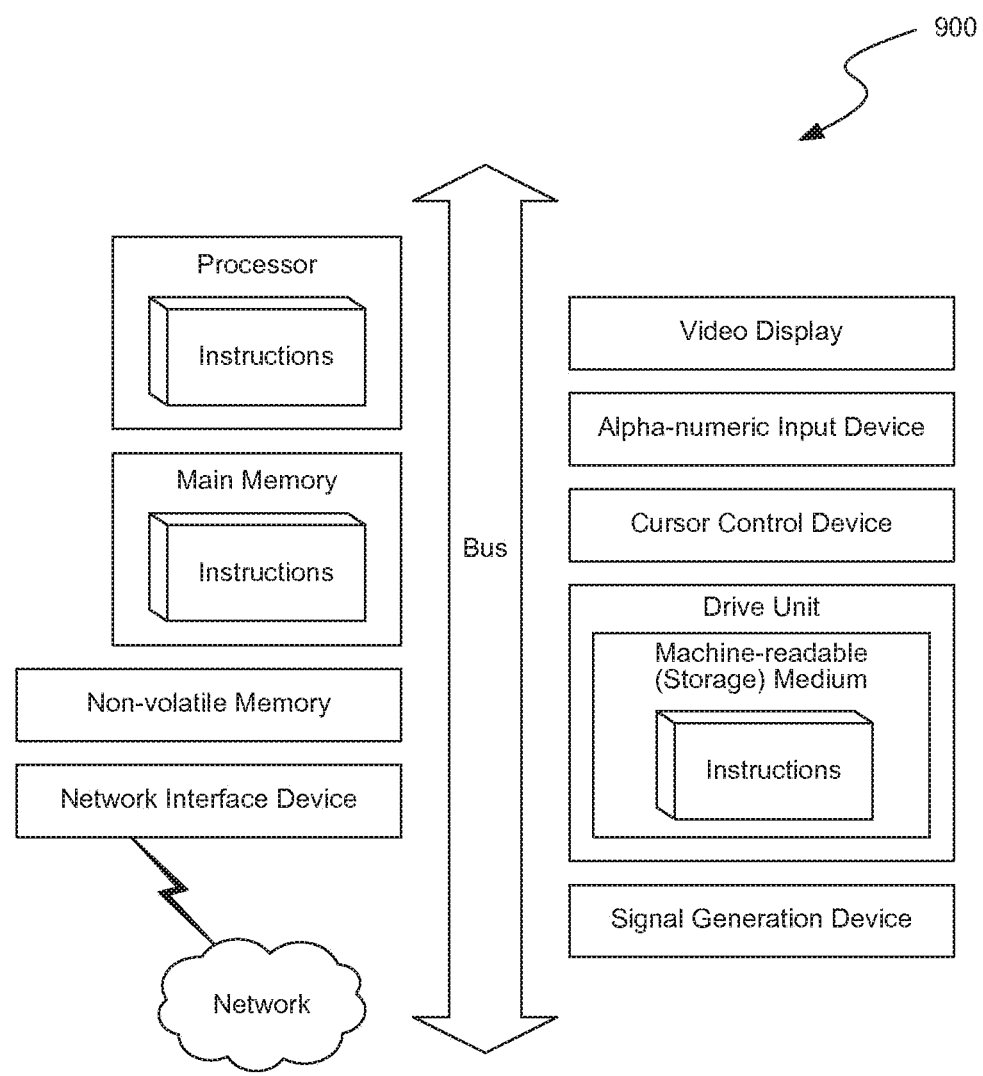
FIG. 9 depicts a diagrammatic representation of a machine in the example form of a computer system within which a set of instructions, for causing the machine to perform any one or more of the methodologies discussed herein, can be executed.

FIG. 9 shows a diagrammatic representation 700 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶ 6, other aspects can likewise be embodied as a means-plus-function claim, or in other forms, such as being embodied in a computer-readable medium. (Any claim intended to be treated under 35 U.S.C. § 112, ¶ 6 begins with the words "means for".) Accordingly, the applicant reserves the right to add additional claims after filing the application to pursue such additional claim forms for other aspects of the disclosure.

What is claimed is:

1. A method for synchronizing an item stored in a workspace hosted by a cloud-based platform, the workspace being shared among a user and a collaborator of the user, the method comprising:
    identifying, at a server associated with the cloud-based platform, an update to the item by a first collaborator in the workspace;
    in response to identifying the update to the item, receiving an instruction to synchronize the item with a second collaborator;
    determining whether, for the second collaborator, the item is subject to modification locally at a device associated with a client application;
    verifying, at the server, if the second collaborator has permission for downloading the item based on the second collaborator being a member of a class having permission to download items from the workspace;
    upon determining that the second collaborator has permission for downloading the item:
        sending the updated item from the server to the client application of the second collaborator;
        synchronizing the updated item between the cloud-based platform and client application of the second collaborator; and
    upon determining that the second collaborator has been removed from the class having permission to download items from the workspace, sending from the server an instruction to the client application that causes the device associated with the client application of the second collaborator to delete the item.

2. The method of claim 1, wherein the synchronizing is performed subsequent to the update to the item by the first collaborator.

3. The method of claim 1, wherein the second collaborator includes one or more of: a co-owner, an editor, a viewer-uploader, or a viewer of the item.

4. The method of claim 1, wherein the item is a folder in the workspace hosted by the cloud-based platform.

5. The method of claim 1, wherein the item is a file in the workspace hosted by the cloud-based platform.

6. A method for synchronizing an item stored in a workspace hosted by a cloud-based platform via a client application of the platform, the workspace being shared among a user and a collaborator of the user, the method comprising:
    receiving, at a client application of the collaborator, the item for synchronization with the platform;
    determining whether, for the collaborator, the item is subject to modification locally at a device associated with the client application;
    selectively protecting the item by locking the item at the client application of the collaborator when the item is modified by the collaborator, wherein the selectively protecting prevents modification of the item by the collaborator; and
    receiving, at the client application, an instruction from the cloud-based platform to delete the item, wherein the instruction is sent from the cloud-based platform to the client application based on the cloud-based platform determining the collaborator has been removed from a class of users having permission for downloading the item.

7. The method of claim 6, wherein the locking is performed by utilizing an operating system (OS) hook that intercepts a function call that relates to modifying content of the item.

8. The method of claim 6, wherein the selective protecting is performed in response to a type of action the collaborator attempts to perform on the item.

9. The method of claim 8, wherein the selective protecting comprises:
    upon determining that the collaborator attempts to modify the item:
        renaming a modified version of the item as a copy; and
        re-downloading the item from the workspace.

10. The method of claim 9, wherein the selective protecting comprises:
    marking the copy as a problem item.

11. The method of claim 8, wherein the selective protecting comprises:
    upon determining that the collaborator attempts to rename the item, renaming the item back to an original name of the item.

12. The method of claim 8, wherein the selective protecting comprises:
    upon determining that the collaborator attempts to move the item, moving the item back to an original location of the item.

13. The method of claim 8, wherein the selective protecting comprises:
    if the collaborator attempts to delete the item, re-downloading the item from the workspace.

14. The method of claim 8, wherein the selective protecting comprises:
    upon determining that the collaborator attempts to delete the item, moving the item back from a temporary delete storage to an original location of the item.

15. The method of claim 8, wherein the item is a folder in the workspace, and wherein the selective protecting comprises:
    upon determining that the collaborator attempts to create a file in the folder, verifying whether the collaborator has permission to upload.

16. The method of claim 15, wherein the selective protecting comprises:
    upon determining that the collaborator does not have the permission to upload, marking the file as a problem item.

17. The method of claim 6, further comprising:
    before the receiving, transmitting an instruction to the cloud-based platform to synchronize the item stored in the workspace.

18. The method of claim 6, further comprising:
    upon receiving the instruction to delete the item, removing the item from all local storages.

19. A server for synchronizing an item stored in a workspace of a cloud-based platform, the workspace being shared among a user and a collaborator of the user, the system comprising:
    a processor;
    a memory having stored thereon instructions which, when executed by the processor, cause the processor to:
        identify, at a server associated with the cloud-based platform, an update to an item by a first collaborator in the workspace;
        receive an instruction to synchronize the item with a second collaborator;

determine whether, for the second collaborator, the item subject to modification locally at a device associated with a client application;

verify, at the server, if the second collaborator has permission for downloading the item based on the second collaborator being a member of a class having permission to download items from the workspace;

upon determining that the second collaborator has the permission for downloading the item:
send the updated item from the server to the client application of the second collaborator;
synchronize the updated item between the cloud-based platform and the client application of the second collaborator; and upon determining that the second collaborator has been removed from the class having permission to download items from the workspace, sending from the cloud-based platform an instruction to the client application that causes the device associated with the client application of the second collaborator to delete the item.

20. The server of claim 19, wherein the synchronizing is performed subsequent to the update to the item by the first collaborator.

21. The server of claim 19, wherein the second collaborator includes one or more of: a co-owner, an editor, a viewer-uploader, or a viewer of the item.

22. The server of claim 19, wherein the item is a folder in the workspace of the cloud-based platform.

23. The server of claim 19, wherein the item is a file in the workspace of the cloud-based platform.

24. A device for synchronizing an item stored in a workspace of a cloud-based platform, the workspace being shared among a user and a collaborator of the user, the system comprising:
a processor;
a memory having stored thereon instructions which, when executed by the processor, cause the processor to:
receive, at a client application of the collaborator, the item for synchronization with the platform;
determine whether, for the collaborator, the item is subject to modification locally at a device associated with the client application;
selectively protect the item by locking the item at the client of the collaborator when the item is modified by the collaborator, wherein the selectively protecting prevents modifications of the item by the collaborator; and
receive, at the client application, an instruction from the cloud-based platform to delete the item, wherein the instruction is sent from the cloud-based platform to the client application based on the cloud-based platform determining the collaborator has been removed from a class of users having permission for downloading the item.

25. The device of claim 24, wherein the locking is performed by utilizing an operating system (OS) hook that intercepts a function call relating to modifying content of the item.

26. The device of claim 24, wherein the selective protecting is performed in response to a type of action the collaborator attempts to perform on the item.

27. The device of claim 26, wherein the processor in performing the selective protecting is further caused to:
upon determining that the collaborator attempts to modify the item:
rename a modified version of the item as a copy; and
re-download the item from the workspace.

28. The device of claim 27, wherein the processor is further caused to mark the copy as a problem item.

29. The device of claim 26, wherein the processor in performing the selective protecting is further caused to:
if the collaborator attempts to rename the item, rename the item back to its original name.

30. The device of claim 26, wherein the processor in performing the selective protecting is further caused to:
upon determining that the collaborator attempts to move the item, move the item back to an original location of the item.

31. The device of claim 26, wherein the processor in performing the selective protecting is further caused to:
if the collaborator attempts to delete the item, re-download the item from the workspace.

32. The device of claim 26, wherein the processor in performing the selective protecting is further caused to:
upon determining that the collaborator attempts to delete the item, move the item back from a temporary delete storage to an original location of the item.

33. The device of claim 26, wherein the item is a folder in the workspace, and wherein the processor in performing the selective protecting is further caused to:
upon determining that the collaborator attempts to create a file in the folder, verify whether the collaborator has permission to upload.

34. The device of claim 33, wherein the processor in performing the selective protecting is further caused to:
upon determining that the collaborator does not have the permission to upload, mark the file as a problem item.

35. The device of claim 24, wherein the processor is further caused to:
before the receiving, transmit an instruction to the platform to synchronize the item stored in the workspace.

36. The device of claim 24, wherein the processor is further caused to:
upon receiving an instruction to delete the item, remove the item from all local storages.

37. A non-transitory computer readable medium having instructions stored thereon, which when executed by one or more processors of a system, cause the system to:
identify, at a server associated with a cloud-based platform, an update to the item by a first collaborator in a workspace;
in response to identifying the update to the item, receive an instruction to synchronize the item stored in the workspace with a second collaborator;
determine whether, for the second collaborator, the item is subject to modification locally at a device associated with a client application;
verify, at the server, if the second collaborator has permission for downloading the item based on the second collaborator being a member of a class having permission to download items from the workspace;
upon determining that the second collaborator has the permission for downloading the item:
sending the item from the server to the client application of the second collaborator;
synchronizing the updated item between the cloud-based platform and the client application of the second collaborator; and
upon determining that the second collaborator has been removed from the class having permission to download items from the workspace, sending from the server an instruction to the client application that causes the device associated with the client application of the second collaborator to delete the item.

38. A non-transitory computer readable medium having instructions stored thereon, which when executed by one or more processors of a system, cause the system to:
- receive, at a client application of a collaborator, an item for synchronization with a cloud-based platform, the item being stored in a workspace hosted by the cloud-based platform, the workspace being shared among a user and the collaborator;
- determine whether, for the collaborator, the item is subject to modification locally at a device associated with the client application;
- selectively protect the item by locking the item at the client application of the collaborator when the item is modified by the collaborator, wherein the selectively protecting prevents modification of the item by the collaborator; and
- receive, at the client application, an instruction from the cloud-based platform to delete the item, wherein the instruction is sent from the cloud-based platform to the client application based on the cloud-based platform determining the collaborator has been removed from a class of users having permission for downloading the item.

* * * * *